United States Patent
Miller et al.

(10) Patent No.: US 8,655,094 B2
(45) Date of Patent: Feb. 18, 2014

(54) PHOTOGRAMMETRY SYSTEM AND METHOD FOR DETERMINING RELATIVE MOTION BETWEEN TWO BODIES

(75) Inventors: Samuel A Miller, Williamsburg, VA (US); Kurt Severance, Yorktown, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 348 days.

(21) Appl. No.: 13/105,004

(22) Filed: May 11, 2011

(65) Prior Publication Data

US 2012/0285024 A1 Nov. 15, 2012

(51) Int. Cl.
*G06T 5/00* (2006.01)
*G06T 15/00* (2011.01)
*G06K 9/00* (2006.01)
*G01B 11/26* (2006.01)
*G01B 5/004* (2006.01)

(52) U.S. Cl.
USPC ........... 382/254; 382/152; 382/153; 382/154; 348/46; 348/135; 345/419; 33/503

(58) Field of Classification Search
CPC .................. G06T 2207/30164; G06T 7/0075; G06T 15/00; G06K 9/00; H04N 13/0239; G01B 11/26; G01B 5/004; G01B 11/022
USPC ........... 382/152, 153, 154, 254; 348/46, 135; 345/419; 33/503
See application file for complete search history.

(56) References Cited

U.S. PATENT DOCUMENTS

| | | | |
|---|---|---|---|
| 4,714,339 A | 12/1987 | Lau et al. | |
| 5,856,844 A | 1/1999 | Batterman et al. | |
| 6,417,836 B1 | 7/2002 | Kumar et al. | |
| 7,042,440 B2 | 5/2006 | Pryor et al. | |
| 7,602,415 B2 * | 10/2009 | von Flotow et al. | 348/144 |
| 7,630,807 B2 * | 12/2009 | Yoshimura et al. | 701/48 |
| 7,768,498 B2 | 8/2010 | Wey | |
| 2006/0082546 A1 | 4/2006 | Wey | |
| 2007/0081695 A1 | 4/2007 | Foxlin et al. | |
| 2009/0240372 A1 | 9/2009 | Bordyn et al. | |
| 2010/0034426 A1 * | 2/2010 | Takiguchi et al. | 382/106 |

OTHER PUBLICATIONS

Rufli, Martin, et al. "Automatic Detection of Checkerboards on Blurred and Distorted Images," Proceedings of the IEEE/RSJ International Conference on Intelligent Robots and Systems, Nice, France, Sep. 2008.

(Continued)

*Primary Examiner* — Matthew Bella
*Assistant Examiner* — Jose M Torres
(74) *Attorney, Agent, or Firm* — Andrea Z. Warmbier (57) ABSTRACT

A photogrammetry system and method provide for determining the relative position between two objects. The system utilizes one or more imaging devices, such as high speed cameras, that are mounted on a first body, and three or more photogrammetry targets of a known location on a second body. The system and method can be utilized with cameras having fish-eye, hyperbolic, omnidirectional, or other lenses. The system and method do not require overlapping fields-of-view if two or more cameras are utilized. The system and method derive relative orientation by equally weighting information from an arbitrary number of heterogeneous cameras, all with non-overlapping fields-of-view. Furthermore, the system can make the measurements with arbitrary wide-angle lenses on the cameras.

20 Claims, 4 Drawing Sheets

(56) References Cited

OTHER PUBLICATIONS

Scaramuzza, Davide, et al., "A Toolbox for Easily Calibrating Omnidirectional Cameras," Proceedings to IEEE International Conference on Intelligent Robots and Systems. Beijing, China, Oct. 7-15, 2006.

Scaramuzza, Davide, et al., "A Flexible Technique for Accurate Omnidirectional Camera Calibration and Structure from Motion." Proceedings of the Fourth IEEE International Conference on Computer Vision Systems, New York, Jan. 5-7, 2006.

Dellaert. Frank, et al., "A Multi-Camera Pose Tracker for Assisting the Visually Impaired," Proceedings of the 2005 IEEE Computer Society Conference on Computer Vision and Pattern Recognition, 2005.

Nister. David. "A Minimal Solution to the Generalised 3-Point Pose Problem," Proceedings of the 2004 IEEE Computer Society Conference on Computer Vision and Pattern Recognition, 2004.

Severance, Kurt et al., "LabVIEW and Complex Photogrammetry," Oral Presentation, Aug. 19, 2009, Hampton, VA.

* cited by examiner

PHOTOGRAMMETRY SYSTEM AND METHOD FOR DETERMINING RELATIVE MOTION BETWEEN TWO BODIES

STATEMENT REGARDING FEDERALLY SPONSORED RESEARCH OR DEVELOPMENT

The invention described herein was made by employees of the United States Government, and may be manufactured and used by or for the Government of the United States of America for governmental purposes without the payment of any royalties thereon or therefor.

BACKGROUND OF THE INVENTION

1. Field of the Invention

The present application is related to photogrammetry utilized to determine the relative position of two bodies.

2. Description of the Related Art

Photogrammetry is the science of making measurements from photographs. In general, the output of photogrammetry is typically a map, a drawing, or a three-dimensional (3D) model of a real-world object or scene. Photographic images are the result of a perspective projection of a 3D object onto two dimensions. Consequently, one or more photographic images can be reverse-engineered to derive the 3D shape of the original object. The solution provides a quantitative relationship between a 3D shape and the two-dimensional (2D) images acquired by cameras.

Accurate photogrammetric measurements require the photographing of high contrast surface features that appear in at least one image. However, many objects commonly measured do not naturally exhibit such features. Accordingly, retro-reflective targets may be attached to the object to artificially provide these high contrast features. When illuminated, these targets reflect light directly back to the illuminating source, causing the targets to appear very bright in contrast to the background.

Various photogrammetry systems for determining relative motion between two bodies have been developed. Although some known photogrammetry systems utilize a single camera, other systems may require two or more cameras having overlapping fields-of-view (FOV). Existing photogrammetry systems may require specific types of camera lenses, and may not permit use of cameras having fish-eye or hyperbolic lenses.

SUMMARY OF THE PRESENT INVENTION

One aspect of the present invention is a photogrammetry system for determining the relative positions of first and second bodies. The two bodies are preferably rigid, or substantially rigid, and one or more imaging devices, such as high speed digital cameras, are mounted on the first body. The cameras may include wide-angle fish-eye lenses, conventional lenses, or an arbitrary lens or mirror. The cameras may have non-overlapping fields-of-view. The second body is provided with at least three targets, such that the camera or cameras can determine a line-of-sight from the cameras to the targets. In a preferred embodiment, the targets comprise a reflective material that is illuminated by a light source, such as an LED. The targets may also comprise LED lights or the like.

The camera or cameras can be still-frame or high speed cameras, preferably capable of at least 60 frames per second. In general, the cameras have a frame rate that is twice the speed of the fastest object being observed. The cameras are operably connected to controllers, and the cameras are synchronized utilizing a clock synchronization signal. An initial target location for each of the at least three targets is measured or otherwise determined. The camera or other imaging device is then utilized to generate a plurality of lines-of-sight from the camera or cameras to each of the at least three targets at a second time that is after the first time. In general, the second time is later than the first time by an amount equal to the inverse of the frame rate of the camera or cameras.

A plurality of equations are then developed and utilized to determine the new location of the second body relative to the first body at the second time. In general, the equations include the distances between the cameras and the targets multiplied by the lines-of-sight and added to the known camera positions, wherein the lines-of-sight are determined by the camera at the second time. This result is set equal to the product of the original target locations multiplied by the unknown rotation and translation of the second body relative to the first body between the first and second times. That is, the matrix equation at a high level is:

DISTANCES*LINES_OF_SIGHT+CAMERA_POSITIONS=ORIGINAL_TARGETS*ROTATION*TRANSLATION

These equations may be arranged into a matrix equation of the form $Ax(\ )=b$, where $x(\ )$ becomes a function of the vector t of unknowns, wherein $x(\ )$ returns the longer vector x. The vector t contains the unknown three Euler angles, three translations, and the distances to the targets. The vector x is identical to t, except that the three Euler angles are replaced with the equivalent nine elements of a standard rotation matrix. In this manner, the function $x(\ )$ can be utilized to compute a valid rotation matrix at every iteration, using the appropriate $\sin(\ )$ and $\cos(\ )$ functions of the Euler angles within t. An algorithm is then utilized to iterate over t and converge upon the best solution $Ax(t')-b=0$. An example of an algorithm is the MATLAB® non-linear least-squares algorithm fsolve( ) which iterates over t. This produces a (nearly-zero) vector $e=Ax(t')-b$, which represents a residual error. The equations can be solved at each camera frame to thereby determine the position of the second body relative to the first body at a large number of times.

The cameras are calibrated to determine a mathematical relationship between a two-dimensional (2D) pixel point in the image plane and a three-dimensional (3D) vector emanating from the center of the camera lenses. A MATLAB® toolbox, called the Omnidirectional Camera and Calibration Toolbox (OCamCalib) may be utilized to facilitate the calibration process for wide-angle lenses or lenses formed with mirrors. The MATLAB® Camera Calibration Toolbox can be utilized for calibration of cameras having longer lenses.

After the cameras have been calibrated, and the initial locations of the targets have been determined, the position and orientation of each camera in the first body coordinate system is determined. This calculation may be termed "space resection," and it may comprise a known process. In one example of a resectioning process, the resection is accomplished by associating "dots" (potential targets) in an image with entries from a database of known target locations. An algorithm that includes three iterations may be utilized to determine the camera's precise location and orientation in the coordinate system of the first body. The first iteration involves a few (three or more) dot-target pairings that a user selects manually. In a second iteration, an automatic pairing function of the algorithm selects dot-target pairs, then recomputes the resection. The automatic pairing function selects all the targets it can reasonably match according to predefined criteria. A third iteration is then utilized to eliminate the worst of the dot-target pairs based on the individual dot-target pair residuals. The residual threshold for deleting dot-target pairs may be the mean value of the second iteration's residuals.

These and other aspects, objects, and features of the present invention will be understood and appreciated by those skilled in the art upon studying the following specification, claims, and appended drawings.

DETAILED DESCRIPTION OF EMBODIMENTS

Figure 1:
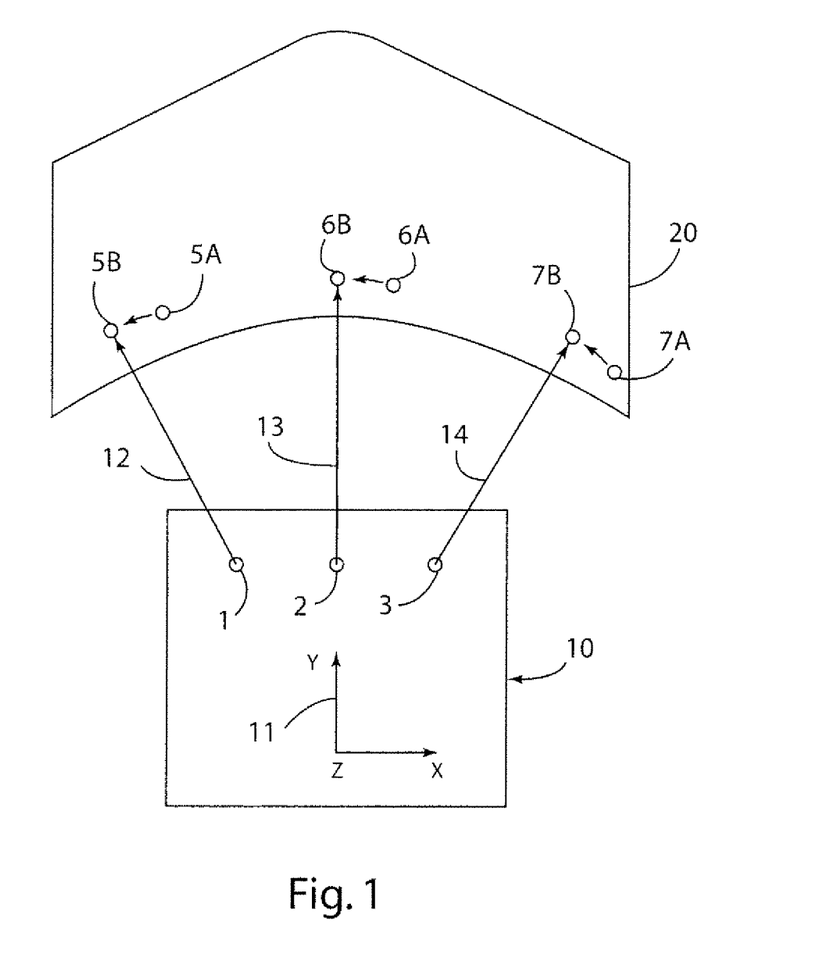
FIG. 1 is a schematic view of a first body having a plurality of cameras, and a second body having a plurality of targets according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a system utilizing the present invention includes first and second bodies 10 and 20. In general, the bodies 10 and 20 may comprise various types of rigid or semi-rigid bodies capable of holding cameras and fiducial markings. In the illustrated example, first body 10 includes a crew module that is mounted to a rocket or other launch vehicle to lift the crew module into space. The second body 20 may comprise a forward faring that fits around the crew module at the time of launch, and later detaches in the event of a launch abort. However, the first and second bodies 10 and 20 may comprise other objects, such as two space vehicles that are to dock in space. Other examples of applications for the photogrammetry system and method of the present invention include in-flight refueling of aircraft, wherein the first and second bodies 10 and 20 comprise fuel delivery and fuel-receiving components that are interconnected for in-flight refueling. Still further, the first and second bodies 10 and 20 may comprise a robot or other movable tool or device and an object being fabricated or assembled. Finally, body 10 may be the Earth itself (solid ground), and body 20 is a moving object.

One or more cameras 1, 2, 3, etc. are mounted to a first body 10. The first body 10 defines a coordinate system 11. As discussed in more detail below, the locations of the cameras 1-3 can be determined in the coordinate system 11. A plurality of targets 5, 6, 7, etc. are fixed to the second body 20. Targets 5-7 should be of such size that they appear to be more than one pixel across in the imaging devices. Although as few as three non-collinear targets may be utilized, more targets are preferably utilized to improve the accuracy of the results. For example, several hundred targets may be utilized. As the second body 20 moves relative to the first body 10, the targets 5-7 move from first locations 5A, 6A, and 7A to second locations 5B, 6B, and 7B, respectively. Lines-of-sight or rays 12, 13, 14 extend from cameras 1, 2, and 3 to the targets 5, 6, and 7, respectively. The cameras 1, 2, 3, etc. generate "dots" corresponding to the targets 5, 6, 7, etc.

In general, the method described in more detail below can be utilized in systems having from 1 to N cameras. The cameras may have different lenses, and different resolutions. Also, although at least three "dots" corresponding to three or more targets must be available to determine the position of body 20 relative to body 10, the same targets do not have to be visible to all cameras at all times. Furthermore, if more than one camera is mounted on body 10, the relative position of body 20 at any point in time can be determined provided that the total number of unique targets that are "visible" to all the cameras on body 10 is at least three.

The cameras 1, 2, 3, etc. are preferably high speed cameras providing at least 210 frames per second. The cameras are synchronized to ensure that all cameras capture frames synchronously. In addition, the time stamps of the cameras are also preferably tied together to provide another approach to characterizing synchronicity. As discussed below in connection with FIG. 6, the cameras may be provided with LED light sources to illuminate the targets 5-7, etc. The cameras may include wide-angle fish-eye lenses. One example of a commercially available fish-eye lens that may be utilized with the cameras 1, 2, and 3 is a Sunex DSL215 available from Sunex Inc., USA, Carlsbad, Calif. This lens has a 185 degree field-of-view. In general, cameras utilized in photogrammetric measurement processes must be calibrated. This involves capturing images from the cameras under controlled conditions and mathematically characterizing the results. The goal of the calibration process is to find a precise mathematical relationship between a two-dimensional (2D) pixel point in the image plane and a three-dimensional (3D) vector emanating from the center of the camera. In general, the choice of a mathematical model depends on the type of camera lens system used. For many standard camera systems with a relatively long focal length, a collinearity model is usually implemented. This model is based on the observation that a 3D object, its corresponding 2D pixel in the image, and the lens center, all lay on the same line. For any pixel in the image plane of this type of camera, a 3D vector out to the scene, also called a line-of-sight, can easily be constructed using a constant vertical vector component (the focal length). This model has been extensively developed, and well-established camera calibration procedures are available for camera systems having a relatively long focal length.

Figure 2:
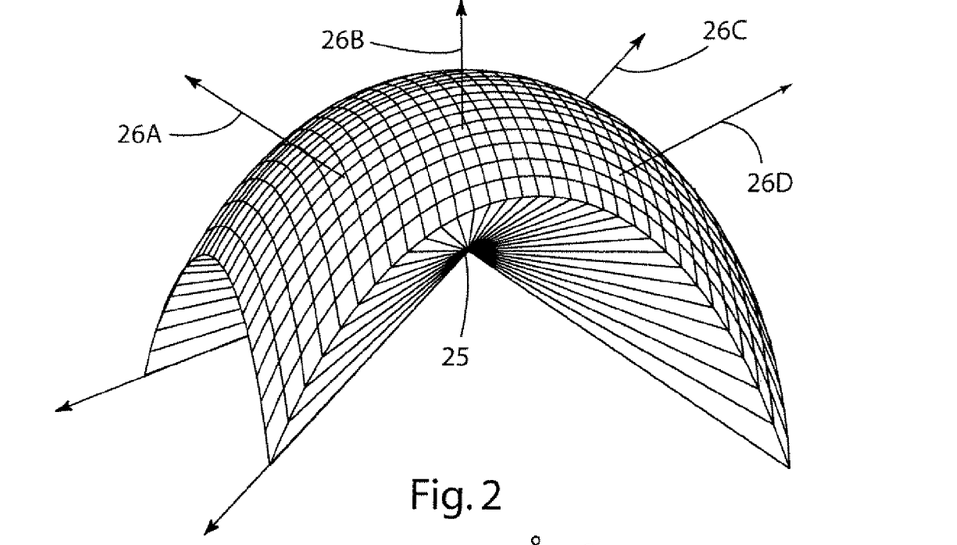
FIG. 2 is a fourth-order three-dimensional (3D) surface representing the focal pattern of a wide-angle camera lens.

However, for cameras having a wide-angle fish-eye lens, the collinearity condition no longer holds true. Fish-eye lenses bend the incoming light such that a very wide angle of incident rays, even up to 90 degrees perpendicular to the optical axis, can be captured on the image plane. To reconstruct the 3D vectors emanating from the camera lens center, the vertical component of the 3D vector is no longer a constant. A calibration procedure for non-linear wide-angle lens systems has been developed and implemented in a MATLAB® toolbox by Dr. Davide Scaramuzza, called the Omnidirectional Camera and Calibration Toolbox (OCamCalib) to facilitate this calibration process. The OCamCalib toolbox is publicly available on line. In this model, the equation for the 3D vector emanating from the camera is a fourth-order polynomial. The 3D structure of this curved polynomial surface is illustrated in FIG. 2. The center of the wide-angle lens 25 and vectors to the 3D scene 26A-26D are shown. If the cameras utilize conventional linear (not wide-angle) lenses, the Camera Calibration Toolbox for MATLAB® developed by the California Institute of Technology can be utilized instead of the OCamCalib toolbox.

The calibration procedure involves capturing numerous pictures of a rigid checkerboard (not shown) placed at random locations around the camera. The OCamCalib software then automatically finds the corner points throughout each checkerboard image. The OCamCalib toolbox analyzes the non-linear distortion present in the images and iteratively determines the effective focal center of the image and the polynomial coefficients that best describe the wide-angle projection pattern. A residual error is also calculated to quantify how accurately the 3D points are mapped into 2D images based on the original checkerboard images. This calibration procedure may be applied to each of the cameras 1, 2, 3, etc. (FIG. 1). With these intrinsic camera parameters, any 2D pixel coordinate capture by one of the cameras 1, 2, 3, etc. can be mapped to a 3D vector out to the scene.

Referring again to FIG. 1, the initial target locations 5A, 6A, 7A, etc. in 3D space in coordinate system 11 must be determined. Suitable commercially available photogrammetry systems may be utilized. According to one example of a suitable method, a laser metrology system first captures the location of a relatively large member of targets (e.g., 30 targets) in the vehicle coordinate frame system 11. A photogrammetry camera then captures an image collage of all the targets' precise locations with respect to each other and derives their relative orientations (this set includes the previously laser-mapped targets). This full target set is then aligned to the laser-measured set, giving three-space coordinates in the vehicle frame 11 to each target. In one example in which the first body 10 comprises a crew module, and the second body 20 comprises a forward faring, the laser metrology system was utilized to map 28 targets, and the cameras (four total in this example) were utilized to map 713 targets.

Figure 3:
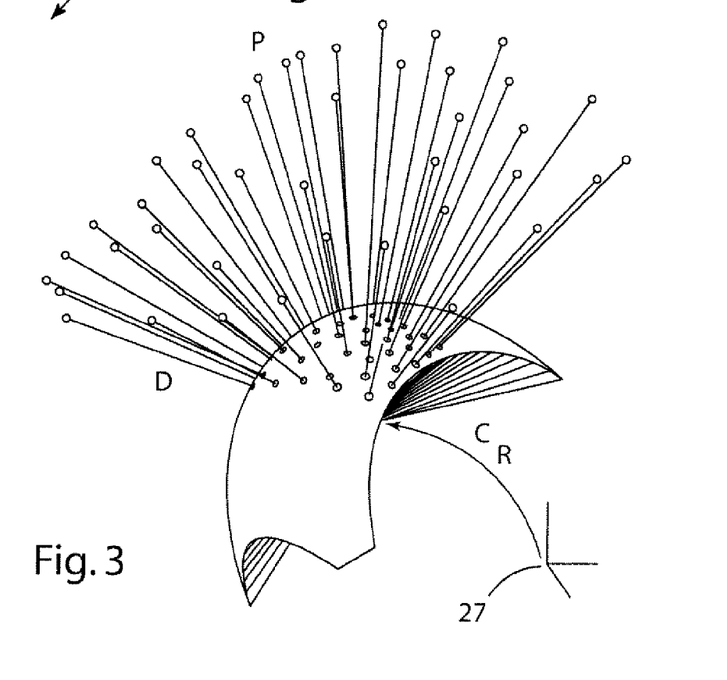
FIG. 3 illustrates a space resection process, whereby unit vectors emanating from a camera are transformed so that they point to their corresponding three-dimensional (3D) target locations.

With further reference to FIG. 3, once each camera has been calibrated, and the locations of the targets in the scene have been determined, the next step is to calculate the position C and orientation R of each camera 1, 2, 3, etc. in the coordinate system 11 of the first body 10. This calculation is termed "space resection" in the photogrammetry literature. This process begins by finding the 2D centroid of each complete target visible to the camera before any motion of the second body 20 occurs. The camera calibration parameters obtained earlier are used to convert each of these centroid coordinates into 3D unit vectors emanating from the center of a camera (conceptually located at the origin 27). The goal is determine the camera rotation R and translation required to transform the unit vectors so that they point to the corresponding 3D targets P as shown in FIG. 3. The matrix equation for this coordinate transformation is summarized as:

TARGET_LOCATIONS=DISTANCES*UNIT_VECTORS*
CAMERA_ROTATION+CAMERA_POSITION

Or simply, P=C+DVR. This matrix equation is non-linear because of sin( ) and cos( ) functions within the camera rotation matrix. The solution includes three rotation angles, three camera position coordinates, and the distances to each of the 3D targets. This answer may be iteratively determined using the non-linear least-squares solver fsolve( ) within MATLAB®, which is based on the Levenberg-Marquardt convergence algorithm. It will be understood that numerous other ways to determine camera orientation are known, and the procedure just described is but one example of a suitable approach.

Matrix equations can be utilized to model the relative dynamics of the first and second bodies 10 and 20, respectively (FIG. 1). If it is assumed that the first and second bodies 10 and 20, respectively, undergo 3D rigid body rotation and 3D rigid body translation, then the relative motion of body 20 with respect to coordinate system 11 on body 10 can be expressed in matrix form, with unknowns in bold, as:

NEW_TARGETS=ORIGINAL_TARGETS*ROTATION*
TRANSLATION

At the same time, images of the targets captured by each calibrated camera 1, 2, 3, etc. can be examined to construct 3D lines-of-sight from the calibrated cameras 1, 2, 3, etc. to the targets:

NEW_TARGETS=DISTANCES*LINES_OF_SIGHT+
CAMERA_POSITIONS

By setting these equations equal to one another, the following equation is obtained:

DISTANCES*LINES_OF_SIGHT−ORIGINAL_
TARGETS*ROTATION*TRANSLA-
TION=−CAMERA_POSITIONS

The detailed matrix equations may be developed as follows. Referring to FIG. 1, the locations of the cameras 1, 2, 3, etc. may be designated $C_0$, $C_1$, $C_2$, etc., respectively. The first target locations 5A, 6A, 7A, etc. may be designated $G_0$, $G_1$, $G_2$, and the new locations 5B, 6B, 7B, etc. may be designated $G_0'$, $G_1'$, $G_2'$, etc. Similarly, the first line-of-sight or "ray" 12 defines a unit vector ($i_0$, $j_0$, $k_0$), the "ray" 13 defines a unit vector ($i_1$, $j_1$, $k_1$), and "ray" 14 defines a unit vector ($i_2$, $j_2$, $k_2$). In general, the number of target locations is at least three, but many more target locations may be utilized to reduce the accuracy of the system and calculations. Similarly, more than one camera may be utilized, if required, for a particular application. The new locations of the targets can be expressed as follows:

$$\begin{bmatrix} G_0^{x'} & G_0^{y'} & G_0^{z'} \\ G_1^{x'} & G_1^{y'} & G_1^{z'} \\ G_2^{x'} & G_2^{y'} & G_2^{z'} \\ \vdots \end{bmatrix}_{(n \times 3)} = \begin{bmatrix} G_0^x & G_0^y & G_0^z & 1 \\ G_1^x & G_1^y & G_1^z & 1 \\ G_2^x & G_2^y & G_2^z & 1 \\ \vdots \end{bmatrix}_{(n \times 4)} \begin{bmatrix} r_{11} & r_{12} & r_{13} \\ r_{21} & r_{22} & r_{23} \\ r_{31} & r_{32} & r_{33} \\ t_x & t_y & t_z \end{bmatrix}_{\substack{(4 \times 3) \\ \text{Rotation and} \\ \text{Translation} \\ \text{(Unknowns)}}}$$

EQUATION 1

With a properly calibrated camera, the "ray" in 3D space along which an object must lie can be determined as follows:

$$G_0^{x'} = d_0 i_0 + C_0^x$$

$$G_0^{y'} = d_0 j_0 + C_0^y$$

$$G_0^{z'} = d_0 k_0 + C_0^z$$

EQUATION 2 where ($i_0$, $j_0$, $k_0$) is the unit vector from camera $C_0$ to target $G_0'$, and $d_0$ is the unknown distance between camera $C_0$ and target $G_0'$.

This can be written as follows for a multi-camera system:

$$\begin{bmatrix} G_0^{x\prime} & G_0^{y\prime} & G_0^{z\prime} \\ G_1^{x\prime} & G_1^{y\prime} & G_1^{z\prime} \\ G_2^{x\prime} & G_2^{y\prime} & G_2^{z\prime} \\ & \vdots & \end{bmatrix}_{(n\times 3)} = \underbrace{\begin{bmatrix} d_0 & 0 & 0 & 0 \\ 0 & d_1 & 0 & 0 \\ 0 & 0 & d_2 & 0 \\ & & & \ddots \end{bmatrix}}_{\text{Unknowns } (n\times n)} \underbrace{\begin{bmatrix} i_0 & j_0 & k_0 \\ i_1 & j_1 & k_1 \\ i_2 & j_2 & k_2 \\ & \vdots & \end{bmatrix}}_{\text{Known } (n\times 3)} + \underbrace{\begin{bmatrix} C_0^x & C_0^y & C_0^z \\ C_1^x & C_1^y & C_1^z \\ C_2^x & C_2^y & C_2^z \\ & \vdots & \end{bmatrix}}_{\text{Known } (n\times 3)} \qquad \text{EQUATION 3}$$

Equations 1 and 2 are set equal to one another, leading to the following equation:

$$\begin{bmatrix} d_0 i_0 + C_0^x - G_0^x r_{11} - G_0^y r_{21} - G_0^z r_{31} - t_x \\ d_0 j_0 + C_0^y - G_0^x r_{12} - G_0^y r_{22} - G_0^z r_{32} - t_y \\ d_0 k_0 + C_0^z - G_0^x r_{13} - G_0^y r_{23} - G_0^z r_{33} - t_z \\ \\ d_1 i_1 + C_1^x - G_1^x r_{11} - G_1^y r_{21} - G_1^z r_{31} - t_x \\ d_1 j_1 + C_1^y - G_1^x r_{12} - G_1^y r_{22} - G_1^z r_{32} - t_y \\ d_1 k_1 + C_1^z - G_1^x r_{13} - G_1^y r_{23} - G_1^z r_{33} - t_z \\ \vdots \end{bmatrix} = \begin{bmatrix} 0 \\ 0 \\ 0 \\ 0 \\ 0 \\ 0 \\ \end{bmatrix} \qquad \text{EQUATION 4}$$

Equation 4 can be rearranged into the form Ax=b, where A and b are known, and the vector x is unknown. Also, let $G_{m,n}$ be the $n^{th}$ target observed by camera m.

$$\begin{bmatrix} -G_{00}^x & 0 & 0 & -G_{00}^y & 0 & 0 & -G_{00}^z & 0 & 0 & -1 & 0 & 0 & i_{00} & 0 & 0 \\ 0 & -G_{00}^x & 0 & 0 & -G_{00}^y & 0 & 0 & -G_{00}^z & 0 & 0 & -1 & 0 & j_{00} & 0 & 0 \\ 0 & 0 & -G_{00}^x & 0 & 0 & -G_{00}^y & 0 & 0 & -G_{00}^z & 0 & 0 & -1 & k_{00} & 0 & 0 & \cdots \\ -G_{01}^x & 0 & 0 & -G_{01}^y & 0 & 0 & -G_{01}^z & 0 & 0 & -1 & 0 & 0 & 0 & i_{01} & 0 \\ 0 & -G_{01}^x & 0 & 0 & -G_{01}^y & 0 & 0 & -G_{01}^z & 0 & 0 & -1 & 0 & 0 & j_{01} & 0 \\ 0 & 0 & -G_{01}^x & 0 & 0 & -G_{01}^y & 0 & 0 & -G_{01}^z & 0 & 0 & -1 & 0 & k_{01} & 0 \\ & & & & & & \vdots & & & & & & & & \\ -G_{10}^x & 0 & 0 & -G_{10}^y & 0 & 0 & -G_{10}^z & 0 & 0 & -1 & 0 & 0 & 0 & 0 & i_{10} & 0 \\ 0 & -G_{10}^x & 0 & 0 & -G_{10}^y & 0 & 0 & -G_{10}^z & 0 & 0 & -1 & 0 & 0 & j_{10} & 0 \\ 0 & 0 & -G_{10}^x & 0 & 0 & -G_{10}^y & 0 & 0 & -G_{10}^z & 0 & 0 & -1 & 0 & 0 & k_{10} & 0 \\ -G_{11}^x & 0 & 0 & -G_{11}^y & 0 & 0 & -G_{11}^z & 0 & 0 & -1 & 0 & 0 & 0 & 0 & i_{11} \\ 0 & -G_{11}^x & 0 & 0 & -G_{11}^y & 0 & 0 & -G_{11}^z & 0 & 0 & -1 & 0 & 0 & 0 & j_{11} \\ 0 & 0 & -G_{11}^x & 0 & 0 & -G_{11}^y & 0 & 0 & -G_{11}^z & 0 & 0 & -1 & 0 & 0 & k_{11} \\ & & & & & & \vdots & & & & & & & & \end{bmatrix} \qquad \text{EQUATION 5}$$

$$\begin{bmatrix} r_{11} \\ r_{12} \\ r_{13} \\ r_{21} \\ r_{22} \\ r_{23} \\ r_{31} \\ r_{32} \\ r_{33} \\ t_x \\ t_y \\ t_z \\ d_{00} \\ d_{01} \\ \vdots \\ d_{10} \\ d_{11} \\ \vdots \end{bmatrix} = \begin{bmatrix} -C_0^x \\ -C_0^y \\ -C_0^z \\ -C_0^x \\ -C_0^y \\ -C_0^z \\ \vdots \\ -C_1^x \\ -C_1^y \\ -C_1^z \\ -C_1^x \\ -C_1^y \\ -C_1^z \\ \vdots \end{bmatrix}$$

Thus, one way to determine the solution is to solve the linear matrix equation Ax=b. Utilizing MATLAB®, this vector can be calculated as x=pinv(A)*b. The pinv( ) function is the pseudo-inverse, which is based on singular value decomposition and linear least-squares analysis. Although the Ax=b solution does not obtain a solution for a single camera, it does provide a correct answer given a perfect camera model in simulations. However, this algorithm is sensitive to Gaussian noise added to the target locations.

An alternative equation of the form Ax(t)=b can be developed, where x( ) becomes a function of the shorter vector t of unknowns, wherein x( ) returns the longer vector x. The vector t contains the unknown three Euler angles, three translations, and the distances to the targets. The vector x is identical to t, except that the three Euler angles are replaced with the equivalent nine elements of a standard rotation matrix. If this matrix equation is set to zero, MATLAB's non-linear least-squares algorithm fsolve( ) can be utilized to iterate over t and converge upon the best solution Ax(t')−b=0, to solve for the unknowns (three Euler angles, three translations, and the distances to the targets). It will be understood that numerous other solvers/algorithms could be utilized to solve this equation, and the fsolve( ) algorithm is merely an example of a suitable approach. The resulting (nearly zero) vector e=Ax(t')−b represents a residual error. Although an iterative process is preferably utilized to converge upon the best solution, criteria for an acceptable (i.e., not "best") solution for vector e can be determined, and an acceptable solution for the equation e=Ax(t')−b can be utilized. In 3D, these errors are the Cartesian distances between a rotated/translated target and its position along a projected line-of-sight from the camera.

Figure 4:
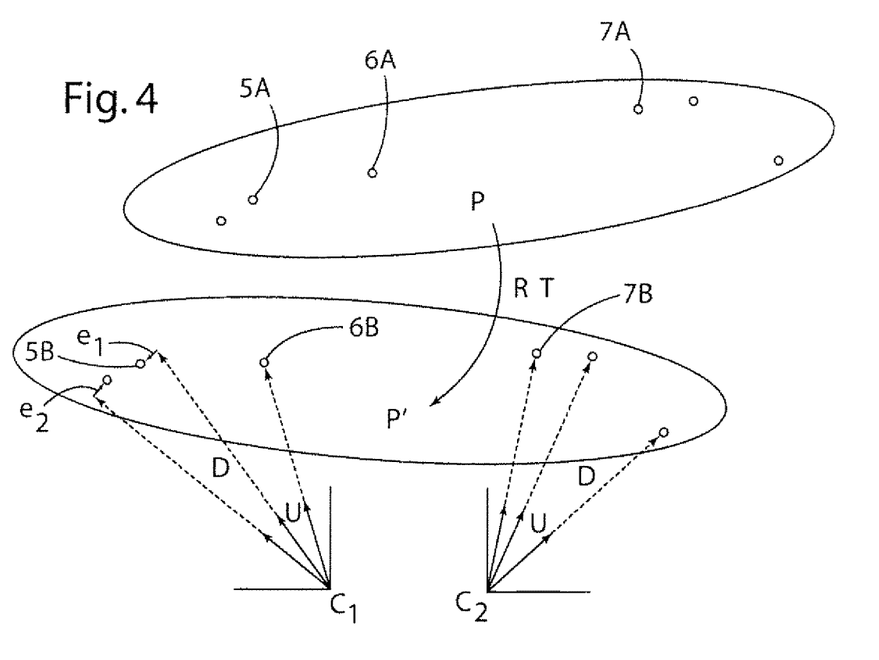
FIG. 4 illustrates a relative dynamics algorithm and residual error.

Referring to FIG. 4, the original (known) target locations are designated "P," and the new target locations are designated "P'." The rigid body rotation is designated R, and the rigid body translation is designated T. The distances are designated D, and the unit vectors are designated U. The calibrated first camera position is designated $C_1$, and the second calibrated camera position is designated $C_2$. In FIG. 4, the residuals are designated $e_1$ and $e_2$. The non-linear least-squares algorithm fsolve( ) minimizes the residuals $e_1$, $e_2$, etc.

As discussed above, each camera's calibration identifies the coefficients of a polynomial describing its wide-angle lens' distortion, and the camera's precise location and orientation in the vehicle coordinate frame 11 (FIG. 1) is determined through an implementation of the "resection" equations discussed above. The resection is accomplished by associating "dots" in an image with entries from a database of known target locations. Hereafter, when discussing this pairing, a "dot" is a target observed by a camera, or, more specifically, an object in the camera's field of view. The image processor "thinks" is a target. A "target" is an entry from a database of known targets.

A software program implementing this process calculates the camera position and orientation in three iterations. The first iteration involves only a few dot-target pairings that a user selects manually. This first set does resect the camera, but a higher confidence calculation requires more targets. The second iteration of the program provides a higher confidence calculation. In the second iteration, an automatic pairing function selects dot-target pairs, then recomputes the resection. The automatic pairing function selects all the targets it can reasonably match according to predefined criteria. The third iteration throws out the worst of those pairings based on the individual dot-target residuals. The residual threshold for throwing out dot-target pairs is the mean value of the second iteration's residuals. The resection program's flow is outlined as follows:

Camera Resection Program
open target database
open camera information file with initial camera location guess
open image from which to derive camera location
run extract dots
limit database scope to relevant targets
manually pair 6 or more dots with targets
   calculate resection equation
   product: rough camera position
auto pair dots with targets using rough camera position
calculate resection equation with new dot-target pairs
   product: refined camera position
cull dot-target pairs with high residuals
calculate resection equation with remaining dot-target pairs
   product: final camera position The extract dots function forms the basis of both the resection and relative orientation algorithms in that it processes a raw image taken from a camera and extracts dot positions. The particular steps are as follows:

Extract Dots
store input image in buffer
square root equalize (to improve contrast)
local threshold to create binary image (threshold extracts objects brighter than the local background)
remove objects from image edge
remove small objects by area filter
remove objects by compactness (compactness=area/ (bounding box width·bounding box height)
remove non-ellipsoids (targets are all ellipsoids)
remove objects with holes
dilate objects
store dilated binary image as mask
retrieve original image and apply mask (thus only dots are shown)
sharpen edges with median filter (eliminates stray pixels, without removing contours)
local threshold (same as above)
centroid (x and y center of mass)

The auto pair function automatically pairs each dot in an image's data structure with a database target (if there is one). First, it creates a set of unit vectors pointing from the camera to each target in the database. It then calculates the angular distance between each dot's unit vector derived utilizing the camera calibration described above, and all the unit vectors just created from the target database. The target whose unit vector most closely aligns is paired with that dot. A user-defined threshold avoids dot-target pairings with large angular differences.

Figure 5:
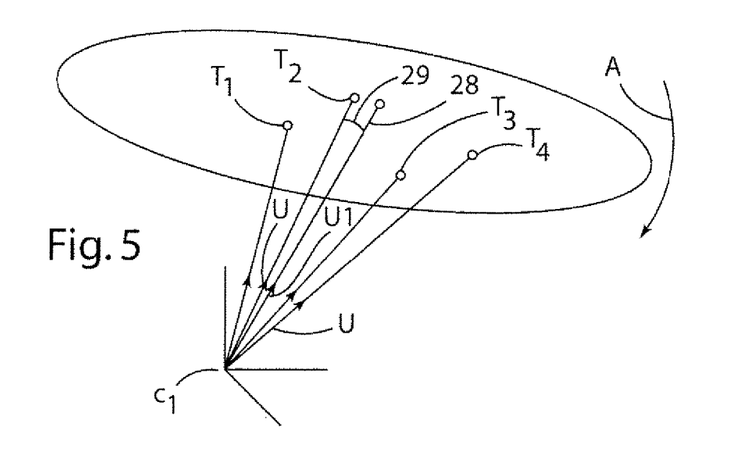
FIG. 5 illustrates dot-target automatic pairing utilized for camera resectioning.

Although not applicable for the resection program, if a dot already has a target pairing, the auto pair simply checks to ensure that the dot's unit vector is aligned within the user-defined threshold. If the angular difference is too large, it finds a closer target to pair with. Another point, although it is not a factor for the resection program, when auto pair is used for relative orientation calculations, the locations of the targets is their last known location, which is derived from the previous image set. The dot-target automatic pairing process is shown in FIG. 5. The unit vectors from the camera $C_1$ to the target locations $T_1$, $T_2$, $T_3$, $T_4$, etc. at the last iteration are designated U. The rotation and translation from the last iteration is shown schematically by arrow "A." The dot-target automatic pairing process pairs a dot 28 with a target $T_2$ having the smallest angular difference 29.

From a performance standpoint, auto pair is approximately an $O(n^2)$ function, which is a significant performance factor effecting the relative orientation calculation. The automatic nature of the relative orientation program is due in large part to auto pair. Manually pairing dots with targets may be extremely tedious and error prone.

The computer code utilized to calculate relative orientation is similar in concept to the resection code described above, and a significant amount of the resection code is used in the relative orientation program. The significant difference, however, is tracking dots from one frame to the next, and ensuring those dots are associated with the correct database targets. An overview of the relative orientation program is as follows:

Relative Orientation Program
open target database
open camera information file with calculated camera locations
open ordered image data sets (one for each camera)
for each image
   in parallel, do the following for each camera
      extract dots from the current image
      create data structure to hold dots
      using track dots, determine which dots from previous image appear in the current image
      preserve only persistent dots
      update current data structure with previous image's data structure (i.e. preserve the last dot-target pairing if possible)
      run auto pair to find dot-target pairings for non-updated dots
      bundle dot-target pairs for relative orientation calculation
   calculated relative orientation equation with initial pairings
   product: initial relative orientation
   cull dot-target pairs with high residuals
   calculate relative orientation equation with remaining pairings
   product: final relative orientation
   output final orientation to file The relative orientation program's extract dots and auto pair functions are exactly the same as those used for camera resection. The relative orientation program and the data germane to the relative orientation calculation are stored in the data structure. Each dot is given a unique identification (ID) number, which is passed from iteration to iteration as long as the dot persists from one frame to the next. All the other data associated with that dot is then added to the data structure during program execution. As new dots are found, new data structure elements are created.

The track dots function takes the coordinates of a dot in the current image, and tries to find a dot in the previous image with close to the same coordinates. If it can find one within a user-defined radius, it associates the old dot's ID number (and hence that dot's target pairing) with a new dot, and increments the persistence value. If one is not found, the function creates a new data structure with a new ID number for that dot.

The persistent dot function filters through the data structure collections, passing only those dots to the remainder of the program that have persisted through a user-defined number of images.

As indicated above, in the relative orientation program, the data from all the cameras is bundled together and sent to the relative orientation function. The function populates the equations with the dot-target pairs and camera information and calculates the relative orientation of the first and second bodies 10 and 20. As discussed above, the equations provide residuals, and these residuals are inserted back into the data structures of the dot-target pairs. Additionally, relative orientation calculates residual statistics, and recommends a residual threshold. The threshold is set as the residual mean plus a user-defined number of standard deviations. Intrinsically, this assumes normality of the residual distribution (not necessarily true), but it functionally allows the program to cull those dot-target pairs that contribute the highest residuals to the solution. (After calculating a new relative orientation solution, that rotation-translation solution is applied to the original target database, so auto pair can automatically select dot-target pairings in the next iteration).

The cull function goes through the bundled data structures, and removes dot-target pairs with residuals above relative orientation's statistically-derived maximum threshold. In practice, this is very effective at eliminating dot-target pairs that contribute the most error to the overall orientation solution. The targets most often eliminated are those in the peripheral of the camera's field-of-view, the lens region with the most distortion.

While the relative orientation program executes, no user supervision is required. This result stems from the core function's various methods to verify dot-target pair validity, primarily from a stochastic perspective. All the functions also output robust metrics, which allow exceptional algorithmic observability. The following list illustrates the particular statistic-based sections of the code and their observable metrics that cumulatively contribute to a robust, accurate, and automatic relative-orientation calculation:

extract dots finds dots by looking for round, bright image segments: visual evaluation is the metric confirming extracted dots are actually targets;
persistent dots associates dots from frame to frame: observability metric is the statistics on frame-to-frame dot movement, and each dot's persistence count;
auto pair uses the known target locations from the previous image and a) rechecks existing pairings against an alignment threshold, and b) finds new pairings if needed: the evaluation metric is the average angular alignment of a dot-based unit vector with a camera-to-target unit vector, (which is a slightly skewed metric, because it is based on the previous image's target position); and
cull deletes dot-target pairs contributing the most error to the final solution: evaluation metric is the mean and standard deviation of the second relative orientation calculation's residuals.

Figure 6:
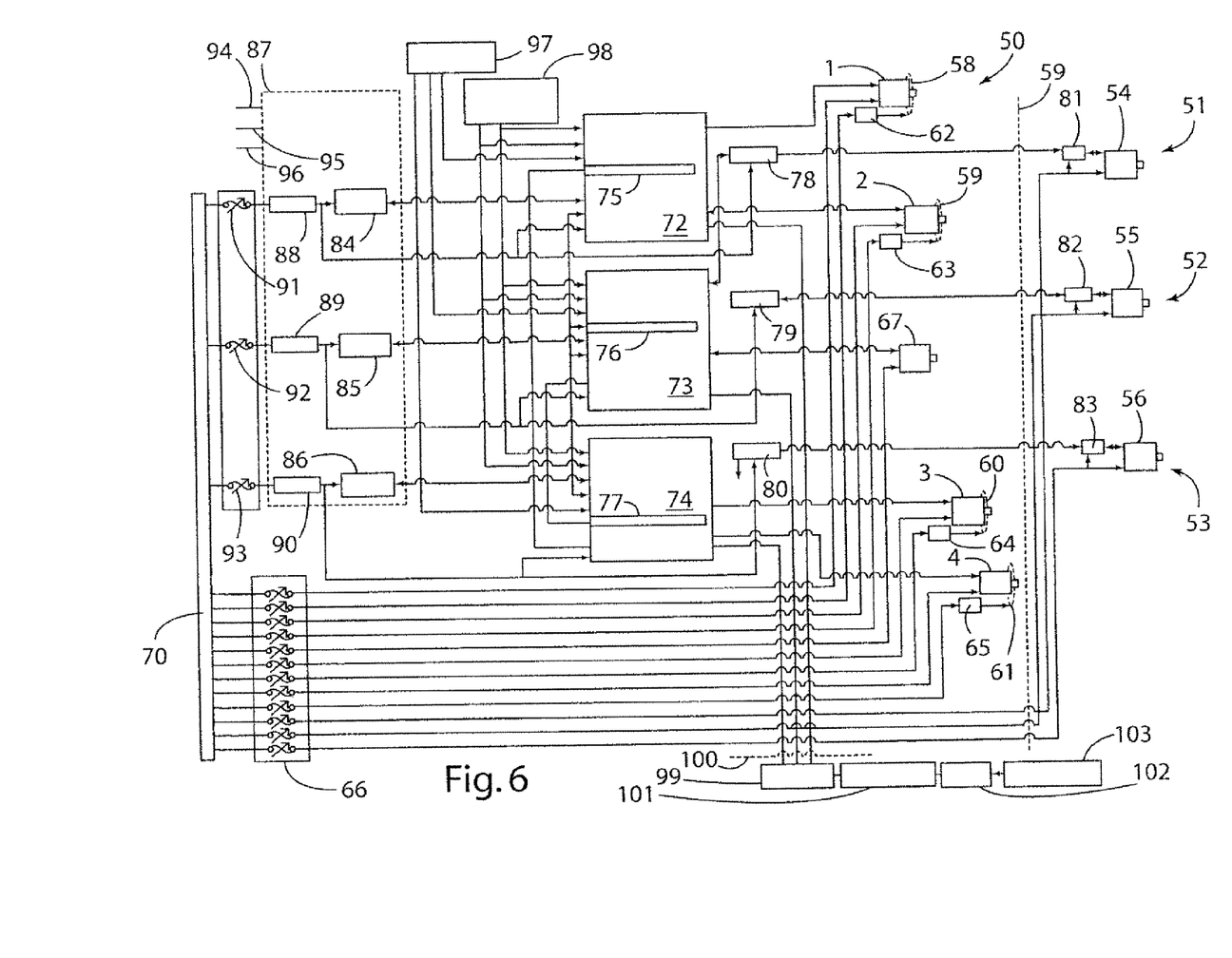
FIG. 6 illustrates a high speed camera system architecture according to one aspect of the present invention.

An architecture of a high speed camera system 50 according to one aspect of the present invention is illustrated in FIG. 6. The camera system 50 illustrates a camera system utilized with first and second bodies 10 and 20 including a crew module and a forward faring, respectively. The camera system 50 includes three recording systems 51, 52, and 53 running in parallel. The camera system 50 includes three cameras 54, 55, and 56 that are mounted to the second body 20 (FIG. 1). Cameras 54-56 are not utilized to determine relative position between first and second bodies 10 and 20, but rather are utilized to collect other data relative to a launch-abort system. Upon separation of second body 20 from first body 10, the cameras 54-56 are disconnected along line 57. The camera system 50 of FIG. 6 includes four cameras 1-4 that are utilized to determine target locations as described in more detail above. LED light rings 58-61 may be utilized to illuminate the targets in second body 20. The LED light rings 58-61 are operably connected to a power bus 70, and voltage regulators 62-65 regulate the voltage supplied to the LED light rings 58-61. A camera 67 is utilized to record data concerning separation of the rigid bodies 10 and 20, but the camera 67 is not utilized to determine the relative orientation of the bodies 10 and 20. The cameras 1-4, 54-56, and 67 are also operably connected to power bus 70. The cameras 1-4, 54-56, and 67 and LED light rings 58-61 are controlled by switches 66.

The camera system 50 also includes first, second, and third camera controllers 72, 73, and 74, respectively. Camera controller 72 includes a master clock synchronization unit 75, and camera controller 73 includes a master frame synchronization feature 76. Camera controller 74 includes a clock synchronization feature 77. The cameras 54-56 are operably connected to the camera controllers 72-74 by CL2 fiber units 78-83. The camera system 50 also includes solid state drive arrays (SSDAs) 84, 85, and 86, which are contained within a waterproof enclosure 87. The SSDAs 84-86 are operably connected to the power bus 70 by voltage regulators 88-89 and switches 91-93, respectively. An SSDA temperature monitor 94 is utilized to monitor the temperature of the SSDAs 84-86, and a pressure monitor 95 is utilized to monitor the pressure within waterproof enclosure 87. A pressurization port 96 is utilized to pressurize the waterproof enclosure 87. An encoder 97 and a camera PSU 98 are operably connected to the camera controllers 72-74. A switch 99 is operably connected to the camera controllers 72-74, and disconnects along a line 100. The switch 99 is connected to a ground support engineering (GSE) computer system 102 by an Ethernet 101, and the GSE system 102 is operably connected to a 120-volt AC power supply 103.

In the examples described above, the various algorithms and equations can be implemented in MATLAB® and LabView®. The system illustrated in FIG. 6 records the camera imaging data during flight of the crew module and forward faring, and the equations and algorithms described in more detail above are utilized as a post-processing tool utilizing stored data. However, the algorithms and equations may be coded in other languages, such as C++, and implemented utilizing a field programmable gate array (FPGA) device to provide real-time calculations concerning the relative positions of the objects.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of determining the relative position of first and second bodies, the method comprising:
providing the first body with at least first and second imaging devices at known imaging device locations relative to the first body in a coordinate system defined by the first body;
providing the second body with at least three non-collinear targets;
providing a known first target location relative to the first body for each of the at least three targets at a first time, wherein the known first target locations are defined in the coordinate system;
utilizing the imaging devices to generate a plurality of unit vectors corresponding to a line-of-sight from the imaging devices to each of the at least three targets at a series of later times that are after the first time, wherein the imaging devices have non-overlapping fields-of-view in at least one of the later times whereby the lines-of-sight of the first imaging device are not to any targets for which the second imaging device has lines-of-sight to;
generating a plurality of equations in matrix form for each of the later times, whereby, for each of the later times, a matrix of known quantities is multiplied by a vector of unknown positions that are a function of time, and subtracting a matrix including the known imaging device locations from the product of the matrix of known quantities and the vector of unknown positions, and setting the result equal to a residual error vector, wherein the matrix of known quantities includes the known first target locations and the unit vectors, and wherein the vector of unknown positions includes three unknown Euler angles, three translations of the targets on the first body relative to the second body, and distances from the imaging devices to the targets;
determining a criteria defining an acceptable residual error vector; and
iterating the equations to converge upon a best solution whereby the residual error vector is minimized to within the criteria.

2. The method of claim 1, wherein:
the equations are iterated utilizing a mathematical algorithm that solves non-linear equations.

3. The method of claim 1, wherein:
the first and second imaging devices comprise cameras that include fish-eye lenses defining centers, the fish-eye lenses having three-dimensional projection patterns with significant curvature about the centers of the lenses.

4. The method of claim 3, wherein:
the cameras define a plurality of pixel points in an image plane, and the cameras are calibrated to determine a mathematical relationship between a vector emanating from the center of the lenses and at least a selected one of the pixel points.

5. The method of claim 4, wherein:
generating a plurality of dots in an image utilizing the cameras; and wherein:
the locations and orientations of the cameras in a coordinate system for the first body is determined by space resection including converting coordinates of at least one of the dots into unit vectors emanating from the centers of the cameras.

6. The method of claim 5, including:
providing a plurality of sectioning targets having known locations; and wherein:
the space resectioning includes a series of at least three iterations, and wherein:
the first iteration includes pairing several dots with several corresponding sectioning targets;
the second iteration includes utilizing a programmable digital device having an automatic pairing function that selects a plurality of dot-sectioning target pairs, followed by recomputation of the resection, and wherein the second iteration generates a residual for each of the selected dot-sectioning target pairs; and
the third iteration removes the worst of the dot-sectioning target pairs based upon predefined criteria.

7. The method of claim 6, wherein:
the predefined criteria comprises the mean value of the residuals generated by the second iteration, whereby each dot-sectioning target pair has a residual value that is greater than the mean value of the residuals generated by the second iteration.

8. The method of claim 1, wherein:
the first and second bodies are substantially rigid.

9. The method of claim 1, wherein:
the imaging device comprises a camera that generates a plurality of two-dimensional pixel points in an image plane; and including:
calibrating the camera to determine a mathematical relationship between a selected two-dimensional pixel point in the image plane and a three-dimensional vector emanating from a center of the camera.

10. The method of claim 1, wherein:
the imaging devices comprise first and second cameras having heterogeneous lenses.

11. A method of determining the relative position of first and second rigid bodies, the method comprising:
mounting at least two cameras on a first rigid body defining a coordinate system, wherein at least one of the cameras has a wide-angle lens, the wide-angle lens defining a center and a field-of-view, and wherein the wide-angle lens has a three-dimensional projection pattern with significant curvature about the center of the wide-angle lens, and wherein the fields-of-view of the at least two cameras do not overlap;
providing a second rigid body with at least three targets that can be utilized by the cameras to form discrete images on image planes of the cameras;
calibrating the cameras;
determining the locations and orientations of the cameras in the coordinate system of the first rigid body;
generating a target database comprising first positions of the at least three targets relative to the first rigid body at a first time;
utilizing the cameras to form a plurality of images corresponding to the targets in a series of frames that are generated at a plurality of later time increments that are after the first time;
determining the locations of the targets in the images to generate known lines-of-sight from the cameras to the targets for the later time increments;
tracking the images from frame to frame;
associating images with the first positions of the targets utilizing the target database;
generating a plurality of equations that can be expressed in matrix form as Ax(t)−b=e, wherein A comprises the known lines-of-sight and the first positions of the targets, t comprises a vector of unknown positions of the targets relative to the first positions of the targets at the later time increments, the vector including three unknown Euler angles corresponding to rotation of the second rigid body relative to the first rigid body, three unknown translations of the second rigid body relative to the first rigid body, and unknown distances of the targets relative to the centers of the lenses, x(t) comprises a function of a shorter vector t of the unknown positions, wherein x( ) returns a longer vector x, b comprises the positions of the cameras in the coordinate system of the first rigid body, and e comprises a residual error vector; and
iterating the plurality of equations over t to converge upon a best solution whereby the residual error vector e is minimized.

12. The method of claim 11, wherein:
the cameras generate two-dimensional pixel points in image planes of the cameras; and wherein:
calibrating the cameras includes determining calibration parameters comprising a mathematical relationship between at least one of the two-dimensional pixel points and a three-dimensional vector emanating from the centers of the lenses of the cameras.

13. The method of claim 12, wherein:
calibrating the cameras includes utilizing a fourth-order polynomial to describe the three-dimensional calibration vector emanating from the centers of the lenses of the cameras.

14. The method of claim 12, wherein:
the targets define centroids; and
determining the camera locations and orientations in the coordinate system of the first rigid body includes utilizing the cameras to faun a plurality of images corresponding to the targets determining the centroids of the targets when the targets are at the first positions.

15. The method of claim 14, wherein:
the calibration parameters are utilized to convert the centroids of the targets into three-dimensional vectors emanating from the centers of the lenses of the cameras.

16. The method of claim 15, including:
determining the rotations and translations of the cameras required to transform the unit vectors such that the unit vectors point to the corresponding three-dimensional targets.

17. The method of claim 16, wherein:
determining the rotations and translations of the cameras is accomplished utilizing a non-linear matrix equation of the form P=C+DVR that is iteratively solved to determine a solution comprising three rotation angles for each camera, three camera position coordinates for each camera, and the distances from the centers of the lenses to the three-dimensional targets, wherein P comprises the positions of the targets in the coordinate system of the first body, C comprises the unknown positions of the cameras, D comprises the unknown distances from the centers of the lenses to the three-dimensional targets, V comprises the calibration vectors, and R comprises the unknown camera rotations.

18. The method of claim 17, wherein:
the at least three targets comprise substantially more than three targets;
determining the camera locations and orientations in the coordinate system of the first rigid body includes:
utilizing the cameras to generate a plurality of images corresponding to the targets when the targets are in the first positions;
manually pairing at least three images with at least three targets;
iteratively solving the equation P=C+DVR to determine a rough camera position;
utilizing an auto pair function to pair substantially more than three images with corresponding targets to form a second group of image-target pairs;
utilizing the equation P=C+DVR and the second group of image-target pairs to determine a refined camera position and second residuals corresponding to each of the image-target pairs;
deleting image-target pairs having residuals above a predefined threshold from the second group; and
solving the equation P=C+DVR utilizing the image-target pairs that remain in the second group to determine a final camera position.

19. The method of claim 18, wherein:
the predefined threshold comprises the mean value of the second residuals.

20. The method of claim 11, wherein:
the plurality of images formed by the cameras are in a digital format, and wherein the frames include a plurality of objects in addition to the images corresponding to the targets, and including:
programming a digital device to filter out and remove objects that are below a predefined size and to remove objects having holes.

* * * * *